United States Patent [19]

DeLuca

[11] 3,852,645

[45] Dec. 3, 1974

[54] TELEPHONE RELAY REPAIR KIT WITH SPACED CONTACT BOARDS

[75] Inventor: Paul V. DeLuca, Port Washington, N.Y.

[73] Assignee: Porta Systems, Corp., Syosset, N.Y.

[22] Filed: July 23, 1973

[21] Appl. No.: 381,801

[52] U.S. Cl. ............... 317/113, 317/101 D, 335/199

[51] Int. Cl. ............................................ H02b 1/04

[58] Field of Search .......... 317/99, 100, 122, 101 R, 317/101 D, 101 DH, 101 CC, 112, 113, 118, 137; 179/95, 147, 179; 335/199, 202

[56] References Cited

UNITED STATES PATENTS

| | | | |
|---|---|---|---|
| 2,858,515 | 10/1958 | Thunander | 317/101 DH |
| 2,931,871 | 4/1960 | Dowds | 335/199 |
| 3,324,431 | 6/1967 | Cataldo | 335/202 |
| 3,445,728 | 5/1969 | Jorgensen | 317/113 |
| 3,483,543 | 12/1969 | Flanagan | 317/101 R |
| 3,493,817 | 2/1970 | Shattuck | 317/113 |
| 3,763,448 | 10/1973 | Walters | 335/199 |

*Primary Examiner*—Robert K. Schaefer
*Assistant Examiner*—Gerald P. Tolin
*Attorney, Agent, or Firm*—Charles E. Temko

[57] ABSTRACT

A device for temporarily or permanently repairing a defective telephone relay without the necessity of disconnecting contact terminals which form part of the original relay structure. The device includes a separate miniaturized replacement relay which is mounted in place of the original relay coil, and a plurality of thin contact boards which are inserted into the interstices between each row of original contacts to bridge the same and reroute the circuits through the replacement relay. Total repair time, in most cases, is in the order of 10 minutes, and the added structure sufficiently small to avoid interference with adjacent relays.

3 Claims, 4 Drawing Figures

TELEPHONE RELAY REPAIR KIT WITH SPACED CONTACT BOARDS

BACKGROUND OF THE INVENTION

This invention relates generally to the field of telephony, and more particularly to replacement circuitry which may be fabricated as a complete kit enabling a repairman to rapidly repair a defective, damaged or otherwise inoperative multi-contact flat spring relay. Such relays are used in very large numbers in telephone centers to establish completed circuitry corresponding to given signal inputs, such as a dialed telephone number. They are normally installed in telephone exchanges in juxtaposed rows for convenience and availability for service. While the detecting of the faulty relay is relatively easily performed, the rapid repair of the same may be considerably more difficult. Very often, the defect is not in the original coil which is normally accessible, but in the contacts themselves which might not close with operation of the relay because of loose wiring, pitted surfaces or broken, bent or weak springs. While it is possible to replace the entire relay, such a replacement requires the reconnecting of many conductors, and a correspondingly substantial period of time to accomplish this, during which time telephone service remains interrupted.

BRIEF DESCRIPTION OF THE PRESENT INVENTION

Briefly stated, the invention contemplates the provision of a replacement relay of modest dimensions which may be mounted in the space previously occupied by the original coil. Connected to the relay are a plurality of contact boards, normally ranging between 3 and 6 in number, depending upon the original relay to be repaired. The contact boards are inserted in the interstices between each row of contacts to reroute the circuits through the replacement relay. A modified cover protects the installed contact boards.

BRIEF DESCRIPTION OF THE DRAWING

In the drawing, to which reference will be made in the specification, similar reference characters have been employed to designate corresponding parts throughout the several views.

DETAILED DESCRIPTION OF THE DISCLOSED EMBODIMENT

Figure 1:
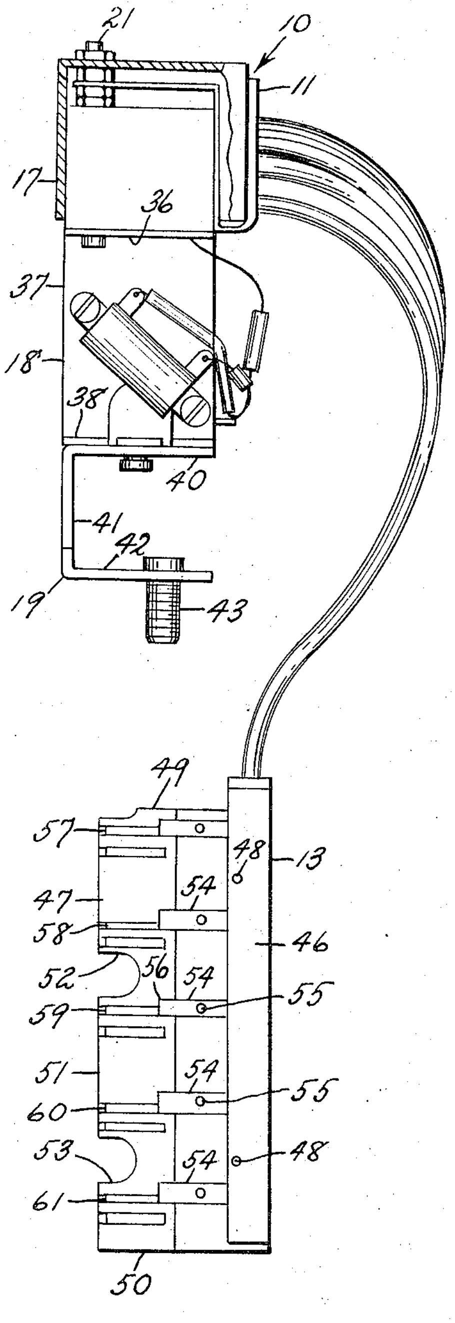
FIG. 1 is a view in elevation of an assembled relay kit embodying the invention, including a miniaturized relay and interconnected contact boards.
Figure 2:
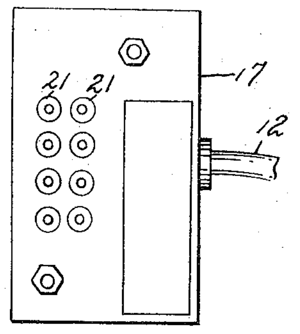
FIG. 2 is an end elevational view of a relay housing as seen from the upper portion of FIG. 1.
Figure 4:
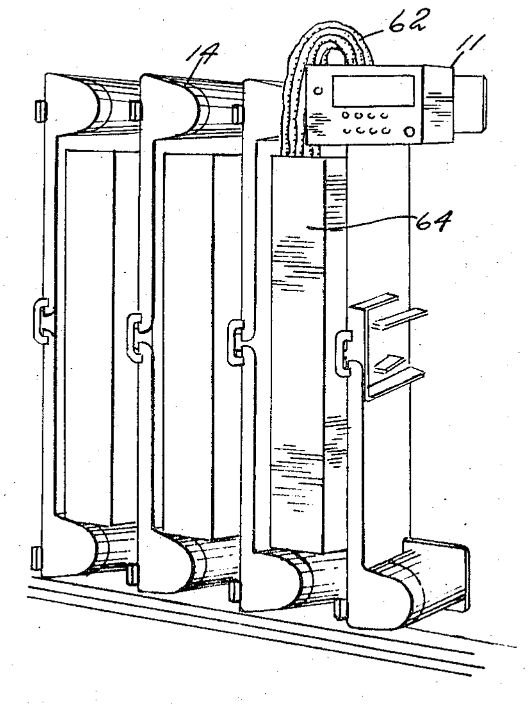
FIG. 4 is a fragmentary view in perspective showing the kit in installed condition in conjunction with a defective relay.
Figure 3:
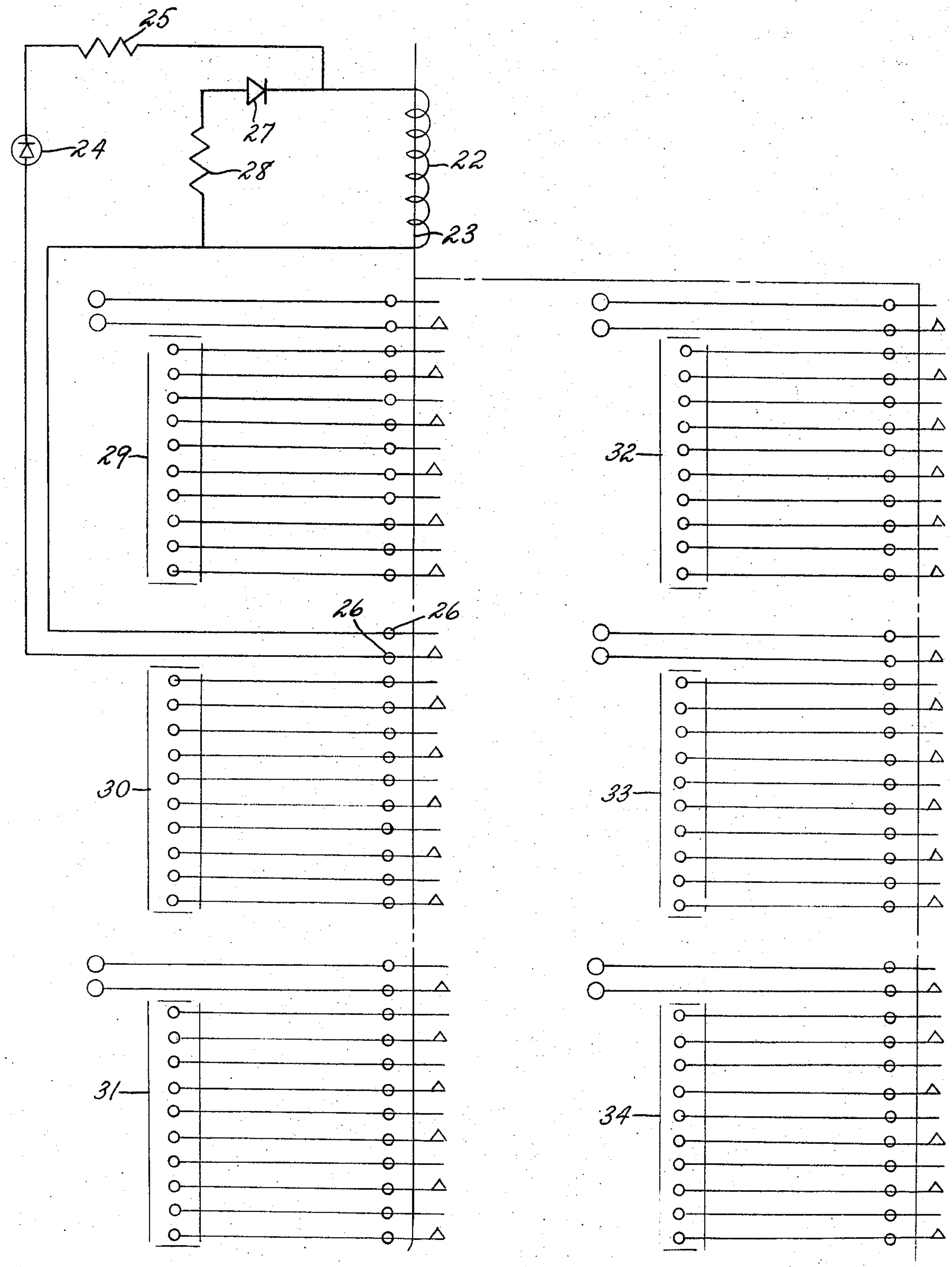
FIG. 3 is a schematic wiring diagram for six contact boards.

In accordance with the invention, the device, generally indicated by reference character 10, comprises broadly: a replacement relay element 11 and a plurality of contact boards 13, the same to be used in conjunction with a conventional standard spring blade telephone relay 14 (FIG. 4).

The replacement relay element 11 is of miniaturized dimentions, and includes a casing element 17, a coil support member 18 and a mounting bracket 19.

The casing element 17 mounts a plurality of pairs of terminals 21 selectively closed by operation of the solenoid coil 22 upon an armature 23. A light-emitting diode 24 is connected in series with a resistor 25, and becomes operative with closing of contacts 26 to show operation of the armature 23. A diode 27 and resistor 28 complete the solenoid coil circuitry. Sets of contacts 29, 30, 31, 32, 33 and 34 replace the contacts on the original relay which remains in situ but inoperative.

The coil support member 18 includes a U-shaped bracket including first, second and third members 36, 37 and 38, respectively. The mounting bracket 19 is also U-shaped, including first, second and third members 40, 41 and 42, respectively, the latter mounting a stud 43 adapted to threadedly engage the mounting of the original coil support.

The contact boards 13 are generally similar, and accordingly, a detailed description of one of such boards will serve to describe all. Each is formed of molded synthetic resinous material, and includes an elongated base member 46 which supports a thin planar member 47 extending laterally therefrom. Interconnecting rivets 48 extend through the members 46 and 47, in well known manner. The planar member 47 is bounded by peripheral side edges 49 and 50, and an inner end edge 51 having scalloped portions 52 and 53 to provide clearance when engaged with the relay contacts. Resilient members 54 serve the joint function of completing electrical circuitry and frictional retention of the contact boards in operative position, the same being secured by rivets 55 to the planar member 47. The free ends 56 are outwardly turned, and flex as required at the time of insertion. A plurality of pairs of elongated openings 57, 58, 59, 60 and 61 are positioned with one end thereof adjacent the edge 51 to engage corresponding spring blades in the original relay to assist in retention of the planar member 47, and hold the spring blades away from each other in electrically open condition, whereby the members 54 form new circuits through one of a plurality of interconnecting cables 62 which establish communication between the replacement relay element 11 and the original relay.

Referring to FIG. 4 in the drawing, it will be apparent that installation of the device is a relatively simple matter. When the defective relay has been located, the original cover 63 is removed, following which a contact board 13 is inserted between the contacts of each row, pressing each one home securely so that all contacts positively mate. The cable 62 will exit at the top half of a conventional relay, and at the bottom on the bottom half of the same. To facilitate the easy insertion of the contact boards, on the upper half of the relay, the first board is inserted into the left set of contacts, working from left to right, and on the lower half of the relay the right set of contacts are first disconnected, and work progresses from right to left.

The original armature flapper is then removed, as it is no longer required. Next the battery and ground wires leading to the original coil are cut, and the original coil removed. The replacement relay element 11 is then mounted by placing the stud thereof in the proper hole on the original mounting bracket, using a self-locking fastener (not shown).

The battery and ground wires are now connected to the new coil. On conventional relays, both the upper and lower coils are normally wired in parallel, and this connection must be maintained. Depending upon which coil has to be replaced, two sets of either two or three wires must be joined, using any acceptable means of splicing. A modified cover 64 is then installed, and the relay can now be restored to service.

I wish it to be understood that I do not consider the invention limited to the precise details of structure shown and set forth in this specification, for obvious modifications will occur to those skilled in the art to which the invention pertains.

I claim:

1. In combination, an inoperative telephone flat spring relay including a plurality of rows of contacts separated by interstices selectively opened and closed by an armature operated by a relay coil, device and a device for repairing said inoperative relay comprising: a replacement relay, means for mounting said replacement relay in the area of said relay coil, a plurality of spaced planar contact boards, individual conductive cables interconnecting each of said boards to said replacement relay, and permitting adjustable relative spacing therebetween, said contact boards each having a planar configuration and being sufficiently thin to be readily inserted in said interstices formed between said rows of contacts to be retained thereby, said contact boards upon being so positioned serving to mate with the rows of contacts to permit retention of said contacts in opened condition and to establish electrical communication to contacts on said replacement relay, whereby said rows of contacts are in effect opened and closed by operation of said replacement relay.

2. Structure in accordance with claim 1, further characterized in said contact boards having resilient means thereon establishing frictional contact with surfaces on said telephone relay for maintaining a retentional action therebetween.

3. Structure in accordance with claim 1, including means on said replacement relay for mounting the same on said telephone relay in the area of the original coil structure thereof.

* * * * *